(12) United States Patent
Raghavan et al.

(10) Patent No.: US 12,038,948 B2
(45) Date of Patent: Jul. 16, 2024

(54) IDENTIFICATION AND CLASSIFICATION OF SENSITIVE INFORMATION IN DATA CATALOG OBJECTS

(71) Applicant: Oracle International Corporation, Redwood Shores, CA (US)

(72) Inventors: Gopal Srinivasa Raghavan, Bangalore (IN); Sathesh Kumar Murthy, Bengaluru (IN); Harsha Madhusudhan, Bengaluru (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/560,132

(22) Filed: Dec. 22, 2021

(65) Prior Publication Data
US 2023/0195755 A1    Jun. 22, 2023

(51) Int. Cl.
*G06F 16/28* (2019.01)
*G06F 21/62* (2013.01)

(52) U.S. Cl.
CPC ........ *G06F 16/285* (2019.01); *G06F 21/6245* (2013.01)

(58) Field of Classification Search
CPC . G06F 16/285; G06F 21/6245; G06F 21/6254
See application file for complete search history.

(56) References Cited

U.S. PATENT DOCUMENTS

| 10,810,317 | B2* | 10/2020 | Williamson | G06F 21/6245 |
|---|---|---|---|---|
| 2019/0222602 | A1* | 7/2019 | Linder | G06F 16/24578 |
| 2020/0104648 | A1* | 4/2020 | Yadav | G06F 17/18 |
| 2020/0125746 | A1* | 4/2020 | Joshi | G06F 21/62 |
| 2021/0182607 | A1* | 6/2021 | Agarwal | G06F 18/24 |
| 2021/0200878 | A1* | 7/2021 | Brannon | G06F 21/606 |
| 2021/0374244 | A1* | 12/2021 | Dontov | G06F 21/568 |

* cited by examiner

*Primary Examiner* — Apu M Mofiz
*Assistant Examiner* — Oscar Wehovz
(74) *Attorney, Agent, or Firm* — Kilpatrick Townsend & Stockton LLP

(57) ABSTRACT

A data catalog system is described that includes capabilities for automatically identifying and classifying sensitive information stored in data objects associated with various data sources. The data catalog system identifies a data object associated with a data asset stored in a data catalog metadata repository and computes a sensitivity score for the data object based on a set of one or more sensitive data identification techniques. The system determines a set of enrichment labels for the data object based on the sensitivity score computed for the data object. The enrichment labels are used to further qualify, enrich, or classify the data objects identified as containing sensitive information. For instance, the enrichment labels may identify a set of custom properties to be assigned to a data object, identify glossary terms to be applied to the data object or the enrichment labels may identify tags to be assigned to the data object.

21 Claims, 10 Drawing Sheets

500 ⟶

⊞ Attribute: ADDRESS Edit ⌒ 502

[Refresh] [Delete]

Summary

▲ Harvested Metadata ⌒ 503

Path: ABC Database/DCAT_INTERN_PROJ/CUSTOMER_INFO
Description: -
Constraints: PRIMARYKEY    Datatype: VARCHAR2
Nullable: -    Length: 50
Last updated Sat, Aug 07, 2021, 10:07 AM UTC    Last harvested: Sat, Jul 17, 2021, 08:05 AM UTC    Last updated in source: Fri, Jul 02, 2021, 06:54 AM UTC
Updated by: joe@abc.com ▲ Custom Properties Edit ⌒ 504

PII Entities ⓘ: Location    Sensitive ⓘ: Yes    Sensitivity Category ⓘ: Biographic - Address
⌒ 506                         ⌒ 508                         ⌒ 510

▲ Tags Edit ⌒ 512 location ⓘ

[Full Address ×]

Glossary Term Edit
ADDRESS ⌒ 514

FIG. 5

IDENTIFICATION AND CLASSIFICATION OF SENSITIVE INFORMATION IN DATA CATALOG OBJECTS

BACKGROUND

In today's information world, the ability to quickly discover, ingest, and manage large amounts of data is essential to the success of an organization and to its users. In order to manage the rapid growth of data, a number of organizations are using data catalogs as their primary tool for efficiently identifying, searching, and retrieving information stored in multiple and diverse data sources of an organization. These data sources may include, for example, databases, object storage systems, file systems, and the like. In order to ingest data from such diverse and heterogeneous data sources, a data catalog system usually includes capabilities to quickly and efficiently ingest and process high volumes of data generated by these diverse data sources.

One of the many challenges faced by data catalog systems is the ability to efficiently classify these high volumes of data on multiple dimensions such as business context, organization structure, confidentiality, sensitivity, and the like. Existing data catalog systems enable users to classify, enrich, and/or annotate metadata associated with data objects through standard Application Programming Interfaces (APIs) or User Interfaces (UI). Among these enrichments, identifying sensitive or confidential metadata plays a key role in protecting an organization's data assets. However, the process of identifying and classifying sensitive metadata is a task that is currently carried out manually by subject matter experts who annotate or enrich the data objects identified as having sensitive or confidential information. Performing such a task manually for a high volume of data objects is a time consuming and error prone process and may also result in data leakages if confidential information is not protected in a time sensitive manner.

In certain approaches, the discovery of sensitive metadata may be performed using several standalone tools. However, leveraging the results of sensitive discovery from these individual tools and then using the results of the tools to classify and categorize the sensitive metadata is a computationally expensive and time consuming process. There is thus a need for making the processing, including the identification and classification of sensitive information stored in data catalog objects more efficient than is possible in existing implementations.

BRIEF SUMMARY

The present disclosure relates generally to data catalog systems. More specifically, but not by way of limitation, this disclosure describes a data catalog system that includes capabilities for automatically identifying and classifying sensitive information stored in data objects associated with various data sources.

In certain embodiments, a data catalog system is disclosed. The system identifies a data object associated with a data asset stored in a data catalog metadata repository and computes a sensitivity score for the data object based on a set of one or more sensitive data identification techniques. The system determines a set of one or more enrichment labels for the data object based on the sensitivity score computed for the data object and provides the set of enrichment labels determined for the data object to a user device associated with the computing system.

In certain embodiments, the sensitivity score for the data object is computed by identifying the set of one or more sensitive data identification techniques to be evaluated. For each particular sensitive data identification technique in the set of sensitive data identification techniques, the system obtains, using the particular sensitive data identification technique, a confidence score for the data object and determines a weight value to be assigned to the particular sensitive data identification technique. The system then determines based on the confidence score and the weight value, a weighted confidence score for the data object.

In certain examples, the sensitivity score for the data object is computed based on the weighted confidence score determined for the data object using each particular sensitive data identification technique in the set of one or more sensitive data identification techniques. In certain examples, the confidence score for the data object is a measure of accuracy of presence of sensitive information in the data object computed by the particular sensitive data identification technique.

In certain examples, the system determines whether the sensitivity score is greater than a first threshold value and in accordance with a determination that the sensitivity score is greater than the first threshold value, determines a first set of enrichment labels to be applied to the data object. The first set of enrichment labels comprise a set of one or more custom properties for the data object, a glossary term for the data object, or a tag for the data object. In certain examples, the set of custom properties for the data object classify the data object into a Personal Information Identification (PII) data object, assign a data sensitivity label to the data object, or classify the data object into a particular type of sensitive data category.

In certain examples, the system determines whether the sensitivity score is lesser than a first threshold value and greater than a second threshold value and in accordance with a determination that the sensitivity score is lesser than the first threshold value and greater than the second threshold value, determines a second set of enrichment labels to be applied to the data object. The second set of enrichment labels comprise a set of one or more custom properties for the data object and a tag for the data object.

In certain examples, the system determines whether the sensitivity score is lesser than a second threshold value and greater than a third threshold value and in accordance with a determination that the sensitivity score is lesser than the second threshold value and greater than the third threshold value, determines a third set of enrichment labels to be applied to the data object. The third set of enrichment labels comprise a tag for the data object.

In certain embodiments, the data object comprises a data entity or a data attribute associated with the data asset. The data asset comprises a database, a file system, or an object storage system in the data catalog metadata repository. In certain examples, the system provides harvested metadata associated with the data object to the user. The harvested metadata comprises information that describes the structure of the data asset associated with the data object, a set of configuration parameters associated with the data asset, and information describing at least a structure and a type of the data object.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there

BRIEF DESCRIPTION OF THE DRAWINGS

Features, embodiments, and advantages of the present disclosure are better understood when the following Detailed Description is read with reference to the accompanying drawings.

FIG. 5 depicts an example of a graphical user interface (GUI) for providing information associated with a data object stored in the data catalog system, according to certain embodiments.

DETAILED DESCRIPTION

Figure 1:
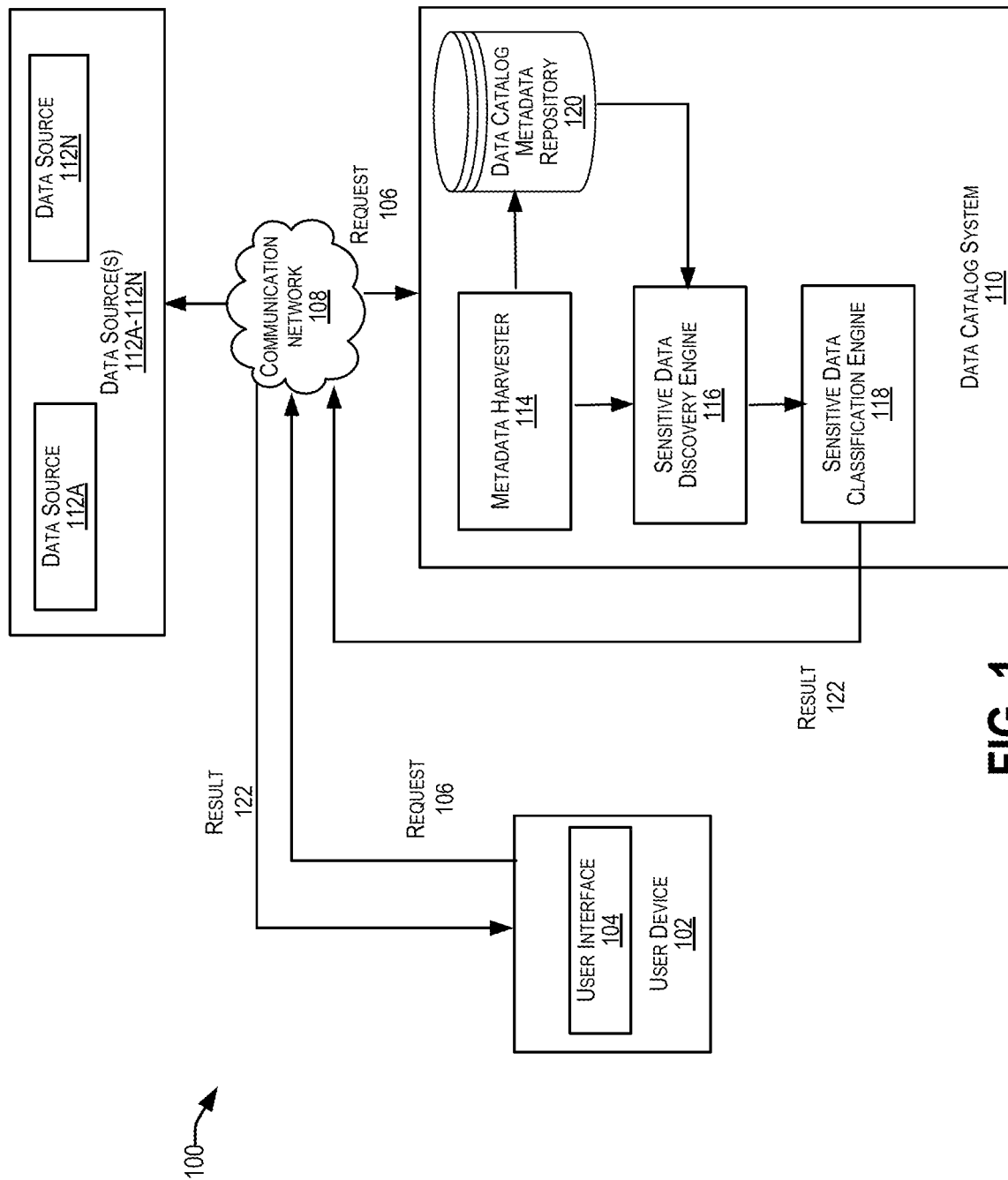
FIG. 1 depicts an example computing environment including a data catalog system that includes capabilities for automatically identifying and classifying sensitive information in data objects associated with a data asset, according to certain embodiments.

The present disclosure relates generally to data catalog systems. More specifically, but not by way of limitation, this disclosure describes a data catalog system that includes capabilities for automatically identifying and classifying sensitive information stored in data objects associated with various data sources.

As previously described, identifying sensitive or confidential metadata plays a key role in protecting an organization's data assets. Sensitive data discovery can help identify data leakages pro-actively, enable data loss prevention, and prevent data breaches and data security compliance issues within an organization. Sensitive information may include, for instance, personal identification information associated with users such as social security numbers, addresses, passport numbers, driver's license numbers, and the like. Sensitive information may also include health information such as medical record identifiers, financial information associated with users such as credit card numbers, banking information, tax forms, and so on.

The data catalog system described in the present disclosure includes capabilities for automatically identifying and classifying sensitive information stored in data objects associated with various data sources. The disclosed system provides several technical advancements and/or improvements over conventional data cataloging systems by identifying and utilizing multiple sensitive data discovery techniques to discover sensitive information stored in data objects. The disclosed system leverages the results of sensitive discovery from each technique and obtains confidence scores computed by each technique. A confidence score as described herein may represent a measure of the accuracy of the presence of sensitive data contained in a data object as computed by the sensitive data identification technique. In certain examples, a confidence score represents a number ranging between 0-100. A higher number indicates a higher probability of sensitive data contained in the data object. The system then performs a weighted computation of the confidence scores obtained using each technique to determine a sensitivity score for the data object. By obtaining sensitive data discovery results (e.g., confidence scores) from multiple sensitive data discovery techniques, the disclosed system is able to provide a higher level of accuracy for identifying and classifying sensitive information in a data object.

Once catalog data objects are discovered as sensitive, the data catalog system automatically classifies the data objects based on the results obtained from sensitive discovery by determining a set of enrichment labels for the data object. The enrichment labels are used to further qualify, enrich, or classify the data objects identified as containing sensitive information. For instance, the enrichment labels may identify a set of custom properties to be assigned to a data object where the custom properties are used to further qualify or classify the data object, the enrichment labels may identify glossary terms to be applied to the data object or the enrichment labels may identify tags to be assigned to the data object. In certain embodiments, the disclosed system includes capabilities to provide the identified and classified sensitive data to multiple downstream services such as data loss prevention systems so that different protection control techniques (e.g., data masking or data exfiltration) can be applied to the sensitive data objects in a timely manner. Furthermore, associating enrichment labels to a data object can provide approved and standard definitions for a catalog object and used by downstream services such as data loss prevention systems in the context of data loss prevention to determine risk exposure levels and to apply appropriate data masking or data anonymization techniques.

Referring now to the drawings, FIG. 1 depicts an example computing environment 100 including a data catalog system 110 that includes capabilities for automatically identifying and classifying sensitive information in data objects associated with a data asset, according to certain embodiments. In the embodiment depicted in FIG. 1, the data catalog system 110 includes several systems and subsystems including a metadata harvester 114, a sensitive data discovery engine 116, and a sensitive data classification engine 118. The systems and subsystems depicted in FIG. 1 may be implemented using software (e.g., code, instructions, programs, etc.) executed by one or more processing units (e.g., processors, cores), hardware, or combinations thereof. The software may be stored on a non-transitory storage medium (e.g., on a memory device). Portions of data or information used by or generated by the data catalog system 110 as part of its processing may be stored in a persistent memory store such as a data catalog metadata repository 120. The computing environment 100 depicted in FIG. 1 is merely an example and is not intended to unduly limit the scope of claimed embodiments. One of ordinary skill in the art would recognize many possible variations, alternatives, and modifications. For example, in some implementations, the data catalog system 110 can be implemented using more or fewer subsystems than those shown in FIG. 1, may combine two or more subsystems, or may have a different configuration or arrangement of subsystems.

The data catalog system 110 may be implemented in various different configurations. In certain embodiments, the data catalog system 110 may be provided as a subsystem in an external system (e.g., enterprise or an organization) and provide data cataloging services and sensitive data identification and classification services to users of the external system. In other embodiments, the data catalog system 110 may be implemented on one or more servers of a cloud provider and its services may be provided to subscribers of cloud services on a subscription basis. The data catalog system 110 may be communicatively coupled to one or more data sources 112A-112N, possibly via one or more communication networks. The data sources may represent databases, object stores, files, documents, message streams, or applications managed by an external system. An external system may represent an enterprise, organization, or business entity that wishes to utilize the services provided by the data catalog system 106.

The metadata harvester 114 in the data catalog system 110 is configured to collect and harvest metadata from the various data sources (112A-112N) and store the harvested metadata in a data catalog metadata repository 120. As part of the harvesting process, the metadata harvester 108 registers a data source (e.g., 112A) as a data asset in the data catalog 120. Registering a data source as a data asset may involve, gathering, by the data catalog system 106, configuration parameters associated with the data source. The configuration parameters may be specific to the type of data source (e.g., a database, an object storage, a file system) and may include, but is not limited to, a hostname, a port identifier, an Internet Protocol (IP) address, a service name, a Universal Resource Locator (URL), a resource identifier, or a protocol type (HTTP, Thrift, Binary, Swift) associated with the data source.

The metadata harvested by the metadata harvester 114 for a data source may include, for instance, information that describes the structure of the data source, the configuration parameters associated with the data source and information that describes the structure and type of data objects within the data source. By way of example, for a data source, 112A, that represents a database, the data objects within the data source may include data entities (e.g., tables) and data attributes (e.g., columns in a table) of the database. For a data source, 112B, that represents a file system, the data entities may include files and the data attributes may represent one or more fields in the file.

The sensitive data discovery engine 116 is configured to process information (i.e., metadata) stored in data objects (e.g., data entities and data attributes) associated with a data asset in the data catalog metadata repository 120 and based on the processing, identify sensitive information stored in the data objects. Sensitive information may include, for instance, personal identification information associated with users of an enterprise such as social security numbers, addresses, passport numbers, driver's license numbers, and the like. Sensitive information may also include health information associated with users such as medical record identifiers, financial information associated with users such as credit card numbers, banking information, tax forms, and so on. For instance, based on the processing, the sensitive data discovery engine 116 may identify that particular data attributes (e.g., columns) of a data entity (e.g., a table) in a data asset (e.g., a database) contain sensitive information. Details related to the processing performed by the sensitive data discovery engine 116 to identify sensitive information stored in data objects is described below with respect to the flowchart depicted in FIG. 2 and FIG. 3 and their accompanying description.

Based on processing performed by the sensitive data discovery engine 116, the sensitive data classification engine 118 determines a set of enrichment labels to be applied to the data object. The enrichment labels are used to further qualify, enrich, or classify the data object identified as containing sensitive information. For instance, the enrichment labels may identify a set of custom properties to be assigned to a data object, where the custom properties are used to further qualify or classify the data object, the enrichment labels may identify glossary terms to be applied to the data object or the enrichment labels may identify tags to be assigned to the data object. Details related to the processing performed by the sensitive data classification engine 118 for determining enrichment labels is described below with respect to the flowchart depicted in FIG. 4 and the accompanying description.

In certain embodiments, a user of an enterprise may interact with the data catalog system 110 using a user device 102 that is communicatively coupled to the data catalog system 110, possibly via one or more communication networks 108. The user device may be of various types, including but not limited to, a mobile phone, a tablet, a desktop computer, and the like. The user may interact with the data catalog system 110 using an application (e.g., a browser) executed by the user device. For example, the user may use a user interface (UI) 104 (which may be a graphical user interface (GUI)) of an application executed by the user device to interact with the data catalog system. For example, the user may, via the UI 104, select or input a data object associated with a data asset and send a request 106 to the data catalog system 110 to obtain enrichment labels identified for the data object. Upon receiving the request from the user device 102, the data catalog system identifies a set of enrichment labels for the data object. The results 122 of the processing performed by the data catalog system are then communicated back to the requesting user device 102. These results 122 may include enrichment labels identified by the data catalog system as being relevant to the data object and possibly other information (e.g., harvested metadata) included in the results. The results 122 along with the metadata harvested for the data object may be output to the user via the UI 104. Details related to the processing performed by the various systems and subsystems in FIG. 1 for identifying and classifying sensitive information stored in data objects associated with a data asset are described below with respect to the flowcharts depicted in FIGS. 2-4 and their accompanying description.

Figure 2:
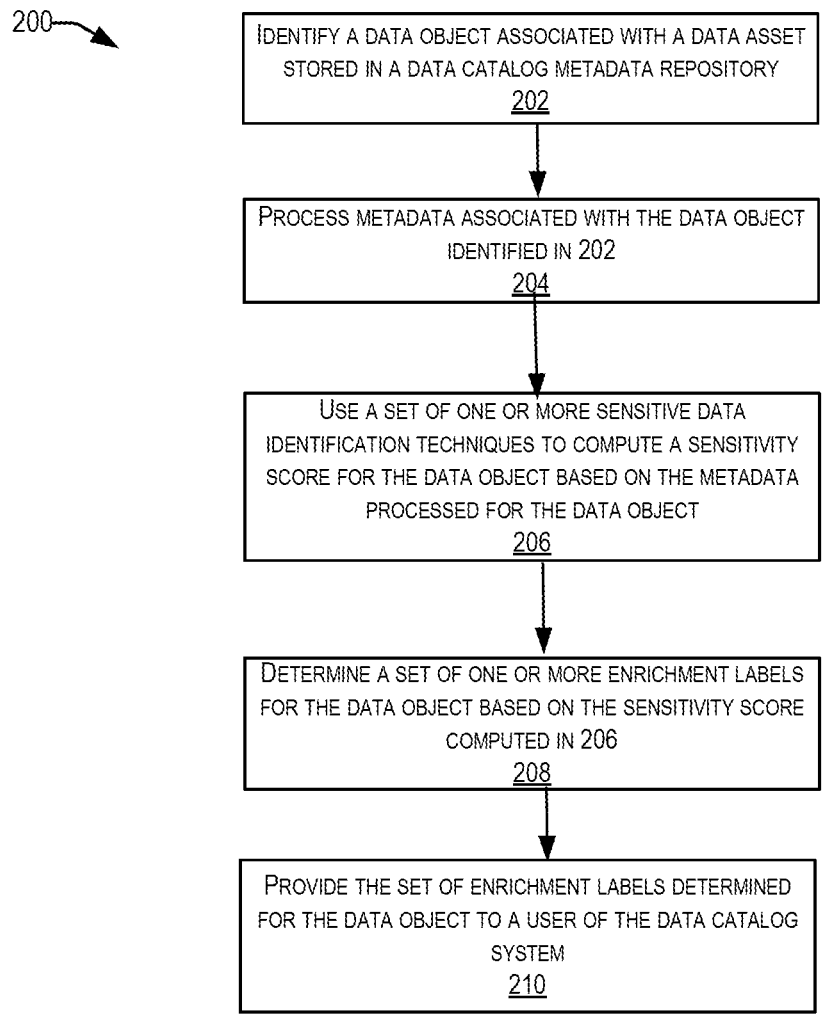
FIG. 2 depicts an example of a process for identifying and classifying sensitive information associated with a data object, according to certain embodiments.

FIG. 2 depicts an example of a process 200 for identifying and classifying sensitive information associated with a data object, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by the data catalog system 110. In certain embodiments, within the data catalog system 110, the processing in 202-210 may be performed by one or more subsystems (116, 118) of the data catalog system.

In the embodiment depicted in FIG. 2, processing is initiated when, in 202, the sensitive data discovery engine 116 retrieves/identifies a data object in the data catalog metadata repository. In certain examples, the data object may represent a data entity or a data attribute of a data asset in the data catalog metadata repository 120. By way of example, a data object in a database asset may represent a data entity (e.g., a table) or a data attribute (e.g., a column) of a table in the database. A data object in a file system data asset may represent a file (data entity) or one or more fields (data attributes) in the file.

At 204, the sensitive data discovery engine 116 processes metadata associated with the data object. In certain examples, processing metadata associated with the data object comprises obtaining a sample of the metadata to generate a sample dataset associated with the data object. Data sampling for a data object may be performed in situations, for example, where the volume of data generated by the data source associated with the data object is very high (e.g., in the order of billions of rows or petabytes of data). The sensitive data discovery engine 116 may utilize various sampling techniques to obtain a sample dataset for a data object. For instance, in one example, the sampling technique may sample data from the first 'n' rows of the data object, where 'n' may be a value defined by the user of the data catalog system. In another example, the sampling technique may sample data from every nth row (e.g., every $5^{th}$ row) which can provide a uniform distribution resulting in better accuracy compared to sampling the first N rows. In certain examples, the sampling technique may be a random sampling technique that applies logic based on the row count of the data source to determine a sample size. For a data source that is a database, this technique may, for instance, utilize underlying database specific functions (e.g., RAND( )) function to perform random sampling.

At 206, the sensitive data discovery engine 116 uses a set of one or more sensitive data identification techniques to compute a sensitivity score for the data object based on the metadata processed for the data object. In certain examples, the sensitivity score for the data object is computed based on individual confidence scores computed for the data object by each technique in the set of sensitive data identification techniques, where the individual confidence scores represent a measure of the accuracy of the presence of sensitive data contained in the data object as computed by the sensitive data identification technique. Details related to the processing performed by the sensitive data discovery engine 116 to identify sensitive information stored in data objects and compute a sensitivity score for the data objects is described below with respect to the flowchart depicted in FIG. 3 and its accompanying description.

At block 208, the sensitive data classification engine determines a set of enrichment labels for the data object based on the sensitivity score. Details related to the processing performed by the sensitive data classification engine 118 for determining enrichment labels is described below with respect to the flowchart depicted in FIG. 4 and the accompanying description.

At block 210, the sensitive data classification engine provides the set of enrichment labels determined for the data object to a user of the data catalog system. As previously described, in certain examples, the set of enrichment labels may be provided to the user in response to a request received from the user (e.g., via UI 104) to obtain enrichment labels for the data object. object. Upon receiving the request from the user device 102, the sensitive data classification engine identifies a set of enrichment labels for the data object and transmits results 122 that may include enrichment labels identified by the data catalog system as being relevant to the data object and possibly other information included in the results. The results 122 may be output to the user via the UI 104.

Figure 3:
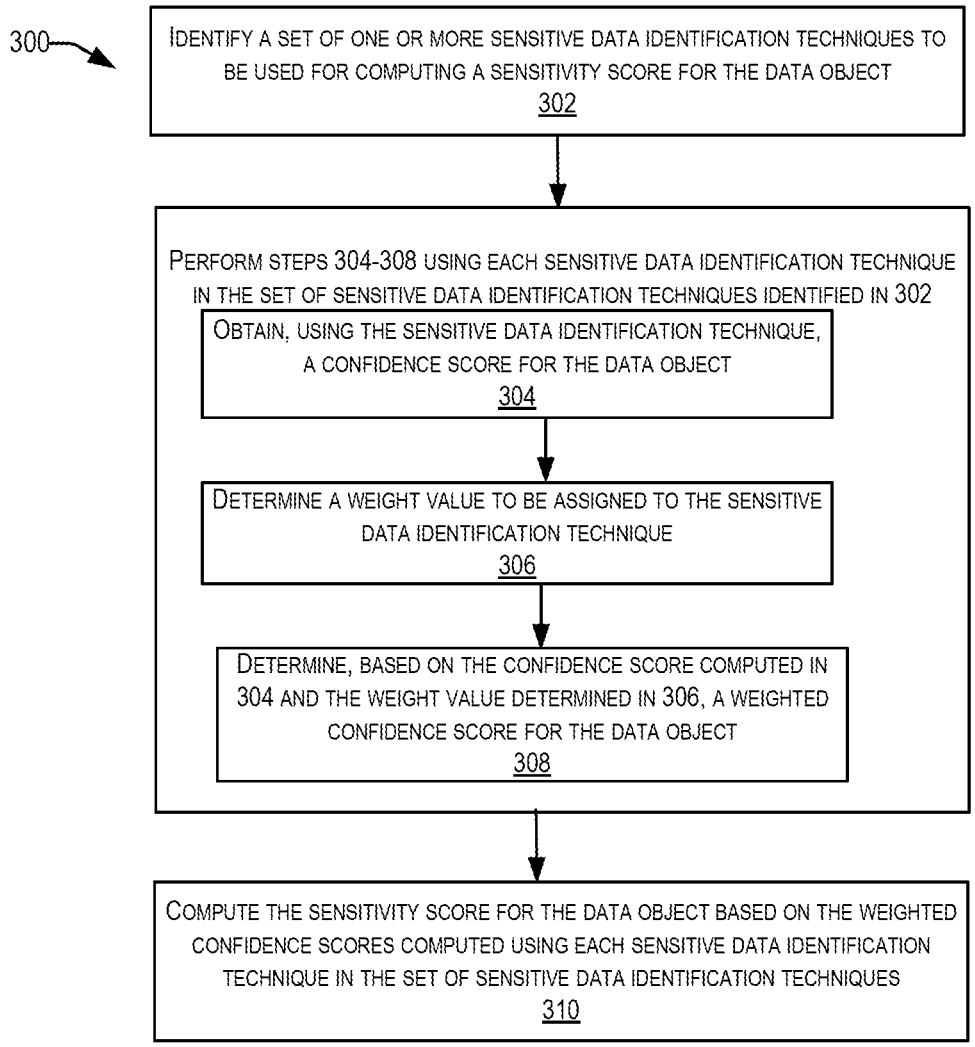
FIG. 3 depicts an example of a process for computing a sensitivity score for a data object, according to certain embodiments.

FIG. 3 depicts an example of a process 300 for computing a sensitivity score for a data object, according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 3 may be performed by the sensitive data discovery engine 116 in the data catalog system 110.

The processing in FIG. 3 is initiated at block 302, when the sensitive data discovery engine 116 identifies a set of sensitive data identification techniques to be used for computing a sensitivity score for the data object identified at block 202 (of FIG. 2). By way of example, the sensitive data discovery engine 116 may identify a first sensitive data identification technique that uses entity recognition to identify entity types such as names of people, locations, products, and organizations in data objects associated with a data asset. This type of sensitive data identification technique may be applicable to identify sensitive information from different types of data assets such as database assets, object storage assets, file system assets, and the like. In another example, the sensitive data discovery engine 116 may identify a sensitive data identification technique that is configured to identify sensitive information stored in relational data assets such as databases. This type of sensitive data identification technique may include capabilities to discover sensitive information stored in column names and column descriptions of database tables. Additional examples of sensitive data identification techniques used by the sensitive data discovery engine 116 may include, but are not limited to, for instance, techniques that are configured to perform pattern inferences to identify sensitive information stored in column names and column descriptions of data objects. This type of sensitive data identification technique may be applicable to discover sensitive information stored in both relational as well as non-relational data sources.

The sensitive data discovery engine 116 then performs the processes described in blocks 304-308 using each sensitive data identification technique identified in block 302. For instance, in a certain implementation, at block 304, the sensitive data discovery engine 116 may utilize a first sensitive data identification technique that is based on entity recognition to obtain a first confidence score for the data object. A confidence score as described herein may represent a measure of the accuracy of the presence of sensitive data contained in a data object as computed by the sensitive data identification technique. In a certain implementation, the confidence score may represent a number between a range of values (0.0-1.0) or (0-100). By way of example, a data object that has a confidence score in the range (0.8-1.0) may indicate that the data object has a high likelihood of the presence of sensitive information, a data object that has a confidence score in the range (0.50-0.80) may indicate that the data object has a medium likelihood of the presence of sensitive information and a data object that has a confidence score that is in the range (0.0-0.50) may indicate that the data object has a low likelihood of the presence of sensitive information.

At block 306, the sensitive data discovery engine 116 determines a weight value to be assigned to the sensitive data identification technique identified in 304. In a certain implementation, the weight value is a pre-determined or default weight value that is assigned by the sensitive data discovery engine 116 to the identified sensitive data identification technique. For instance, the pre-determined weight value may be determined by a user of the data catalog system at the time of configuring the system. In certain examples, the pre-determined weight value may be determined based on the type of data object being processed by the sensitive data identification technique. For instance, the sensitive data discovery engine 116 may assign a first default (pre-determined) weight value to a sensitive data identification technique that uses entity recognition to identify sensitive information, a second default weight value to a sensitive data identification technique that identifies sensitive information stored in relational data assets and a third default weight value to a sensitive data identification technique that uses pattern inferences to identify sensitive information stored in data assets. The first, second and third weight values may be the same or different from each other.

At block 308, the sensitive data discovery engine 116 determines a weighed confidence score for the data object based on the confidence score computed for the data object in 304 and the weight value determined in 306 for the sensitive data identification technique identified in 302. In a certain implementation, the weighted confidence score for the data object is determined by computing a product of the confidence score and the weight value. Additional details of the computation of confidence scores, weight values and weighted confidence scores by the sensitive data discovery engine 116 using various types of sensitive data identification techniques is described using the examples (e.g., example 1, example 2 and example 3) shown below.

In certain embodiments, the sensitive data discovery engine 116 may then repeat the processes described in blocks 304-308 for each sensitive data identification technique identified in block 302. For instance, in a certain implementation, at block 304, the sensitive data discovery engine 116 may utilize a second sensitive data identification technique that includes capabilities to identify sensitive information stored in column names and column descriptions of database assets to obtain second confidence score for the data object and additionally utilize a third sensitive data identification technique that is configured to perform regular expression pattern inferences to identify sensitive information stored in column names and column descriptions of data objects to obtain a third confidence score for the data object. At block 306, the sensitive data discovery engine 116 determines a weight value to be assigned to the identified sensitive data identification technique. At block 308, the sensitive data discovery engine 116 determines based on the confidence score computed in 304 and the weight value determined in 306, a weighted confidence score for the data object.

At block 310, the sensitive data discovery engine 116 computes a sensitivity score for the data object based on the weighted confidence scores computed in block 308 using each sensitive data identification technique identified in block 302. In a certain implementation, the sensitivity score for the data object is determined by identifying the maximum value of the weighed confidence score computed for the data object in block 308. Additional details related to the operations performed by the sensitive data discovery engine to compute a sensitivity score for a data object are further described using examples 1, 2, and 3 shown below.

Figure 4:
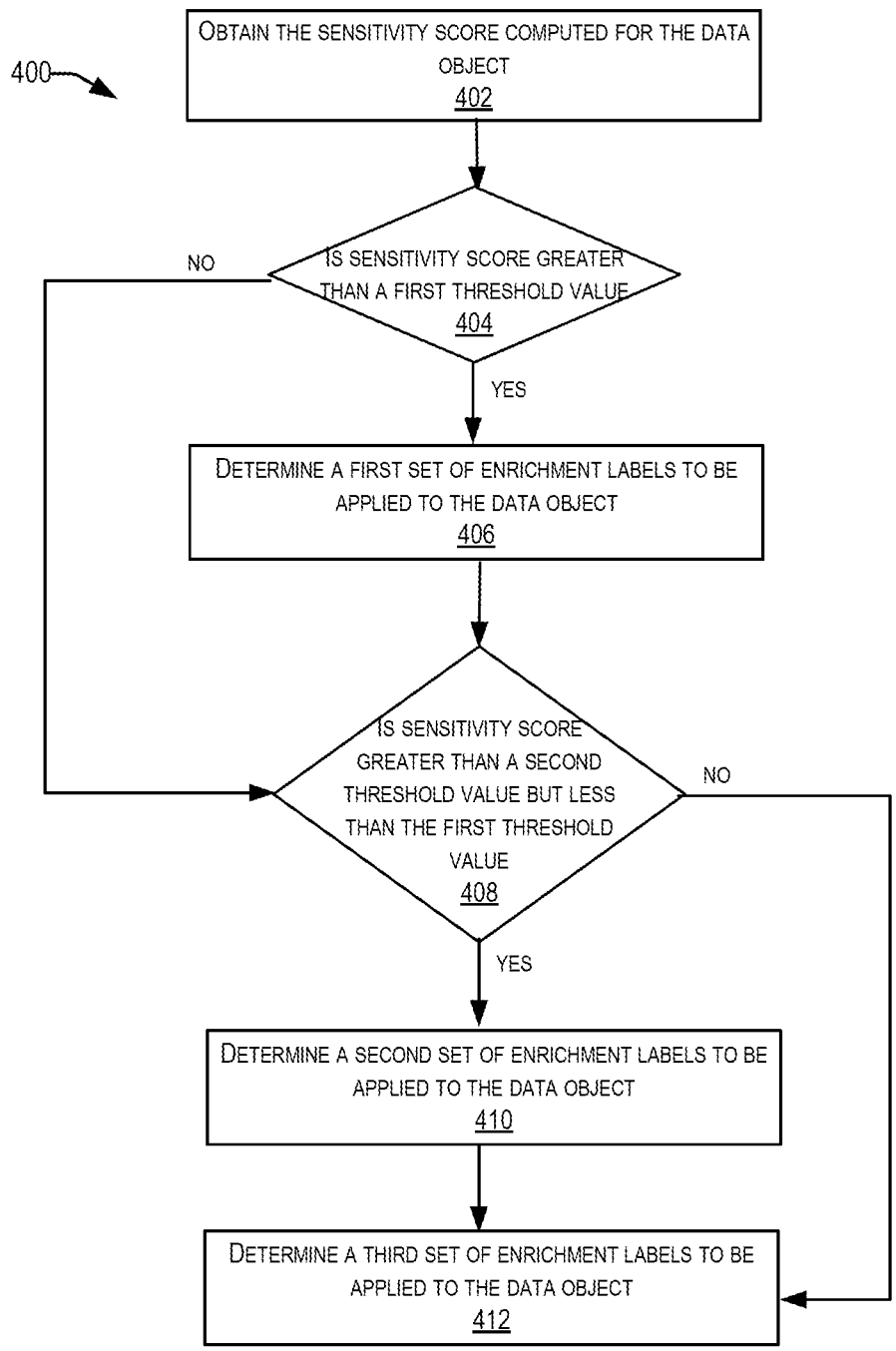
FIG. 4 depicts an example of a process for determining enrichment labels for a data object, according to certain embodiments.

FIG. 4 depicts an example of a process 400 for determining enrichment labels for a data object, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by the sensitive data classification engine in the data catalog system 110.

At block 402, the sensitive data classification engine obtains the sensitivity score computed for the data object. For instance, as described in FIG. 3, the sensitivity score may be computed for the data object by the sensitive data discovery engine as part of the processing performed in block 310 in FIG. 3.

At block 404, the sensitive data classification engine determines if the sensitivity score is greater than a first threshold value. In a certain implementation, the first threshold value is a value in the range between 0.9-1.00. If the sensitivity score is greater than the first threshold value, at block 406, the sensitive data classification engine determines a first set of enrichment labels to be applied to the data object. If the sensitivity score is less than the first threshold value but greater than a second threshold value, at block 410, the sensitive data classification engine determines a second set of enrichment labels to be applied to the data object. In a certain implementation, the second threshold value is a value in the range between 0.75-0.90. If the sensitivity score is lesser than the second threshold value but greater than a third threshold value, the sensitive data classification engine determines a third set of enrichment labels to be applied to the data object. In a certain implementation, the third threshold value is a value in the range between 0.70-0.75. The first, second and third threshold values may be pre-determined by an administrator of the data catalog system at the time of setting up the system.

As previously described, an enrichment label for a data object may identify a classification for the data object that can be further used to qualify the data object. For instance, in one example, the enrichment label may identify a set of custom properties to be assigned to a data object where the custom properties are used to further qualify or classify the data object. For instance, a custom property for a data object may classify the data object into a Personal Information Identification (PII) data object, assign a Data Sensitivity Index (e.g., Internal, Confidential, Highly Confidential, etc.) or a data sensitivity label to the data object, or classify the data object into a particular type of sensitive data category. In another example, the enrichment label may associate a glossary term to the data object where the term has a standard definition across the organization. In another example, the enrichment label may associate a tag with the data object. A tag is a free form text that may be used to link the data object with other similar data objects stored in the data catalog metadata repository.

In certain examples, the first set of enrichment labels applied to the data object by the sensitive data classification engine (for instance when the sensitivity score is greater than the first threshold) include associating a set of one or more custom properties, a glossary term and a tag to the data object. In certain examples, the second set of enrichment labels applied to the data object by the sensitive data classification engine (for instance when the sensitivity score is greater than the second threshold but less than the first threshold) include associating a set of one or more custom properties and a tag to the data object. In certain examples, the third set of enrichment labels applied to the data object by the sensitive data classification engine (for instance when the sensitivity score is greater than the third threshold but less than the second threshold) include associating tags to the data object.

The processing performed by the sensitive data discovery engine 116 to identify sensitive information stored in data objects and the processing performed by sensitive data classification engine 118 determine enrichment labels for a data object based on the identified sensitive information can be better understood using example 1, example 2 and example 3 described below.

Example #1

The first example shown below illustrates the processing performed by the subsystems (e.g., the sensitive data discovery engine 116 and the sensitive data classification engine 118) of the data catalog system shown in FIG. 1 to compute a sensitivity score for a data object and determine a set of enrichment labels for the data object based on the sensitivity score computed for the data object. In example 1 shown below, the data object is a data attribute (e.g., a column) in a data entity (e.g., a table) associated with a database asset in the data catalog 120. The data attribute stores Social Security Numbers (SSN) of employees of an enterprise and is identified as a "SSN" column in the database table with a column name description, "Contains social number of all employees in the organization."

Column Name: SSN

| Column Name Description: Contains social number of all employees in the organization |
|---|
| 778-62-8144 |
| 030 72 7381 |
| 70906649 |
| 16325404 |
| 757-85-7495 |
| 149-13-7317 |
| 909-03-4642 |
| 401318448 |
| 003 06 8815 |

-continued

| Column Name Description: Contains social number of all employees in the organization |
|---|
| 790714615 |
| 805 14 1893 |

Table-1 shown below illustrates the determination of confidence scores, weight values and weighted confidence scores by the sensitive data discovery engine 116 using various types of sensitive data identification techniques identified for the "SSN" column data attribute. The confidence scores may be obtained, for example, as a result of executing block 304 of FIG. 3 and based upon identifying a set of sensitive data identification techniques. The weight values may be assigned, for example, as a result of executing block 306 for each identified sensitive data identification technique. The weighted confidence scores, for example, may be determined as a result of executing step 308 of FIG. 3 after the processing described in 304 and 306 for the identified data attribute is performed using the identified sensitive data identification technique.

TABLE 1

| Sensitive Data Identification Technique | Data Identification Strategy | Confidence Score | Default Weight Value | Weighted Confidence Score |
|---|---|---|---|---|
| Technique -1 (Language Service) | Entity Recognition | 0 | 0.8 | 0 |
| Technique-2 (Data Safe) | Column Name Pattern | 1 | 1 | 1 |
| | Column Description Pattern | 0.95 | 1 | 0.95 |
| | Data Pattern | 0.95 | 1 | 0.95 |
| Technique-3 (Pattern Inference Engine) | Regular Expression Matching for Column Name, Description and Data | 0 | 0.6 | 0 |

As shown in table-1 above, the sensitive data discovery engine 116 identifies a first sensitive data identification technique (technique-1) that uses entity recognition to process the information (metadata) stored in the data attribute (SSN column) to obtain a first confidence score for the data attribute. For example, technique-1 may correspond to a Language Service technique provided by Oracle® that includes machine learning capabilities to detect language in unstructured text. In this example, the first confidence score computed by the first sensitive data identification technique is zero because this technique is generally applicable to the identification of sensitive information contained in non-relational data assets. Accordingly, the weight value assigned by the sensitive data discovery engine 116 for technique-1 is zero. As a result, the weighted confidence score determined by the sensitive data discovery engine 116 for the data attribute using technique-1 is also zero.

As part of the processing performed in block 302 of FIG. 3, in certain examples, the sensitive data discovery engine 116 may identify one or more additional sensitive identification techniques to be used for computing confidence scores for the data attribute. For instance, the sensitive data discovery engine 116 may utilize a second sensitive data identification technique (technique 2) that identifies column name patterns, column description patterns and data patterns in information stored in the data attribute to obtain a second confidence score for the data object. For instance, technique-2 may correspond to the Data Safe technique provided by Oracle® that includes capabilities to identify sensitive information stored in relational database data assets. For example, as depicted in table-1, technique-2 may compute a second confidence score with a value of 1.0 for the column name pattern (SSN) of the data attribute because it identifies the word "SSN" in the column name. Additionally, technique-2 may compute an additional confidence score of 0.95 for the column description pattern because it identifies the word "social number" in the description but this could not necessarily mean SSN (social security number) and hence the confidence score is not 1.0 (or 100%). In addition, technique-2 may also compute a confidence score of 0.95 for the information (data pattern) stored in the data attribute because some rows may have invalid SSN number or null/empty values. In a certain implementation, the maximum value (i.e. 1) of the individual weighted confidence scores computed by the identified technique (technique-2) is obtained and identified as the overall weighted confidence score computed by this technique.

In certain examples, the sensitive data discovery engine 116 may identify a third sensitive data identification technique (technique-3) that uses pattern inferences to compute a third confidence score for the data object. For instance, technique-3 may correspond to a pattern inference engine provided by Oracle® that includes capabilities to perform regular expression matching to identify sensitive information stored in data objects. In this case, the confidence score computed by technique-3 is 0 because this technique is generally not applicable to the identification of sensitive information contained in relational data assets. The predetermined default weight value assigned by the sensitive data discovery engine 116 for technique-3 is 0.6 and the weighted confidence score determined for the data object using technique-3 is 0.

The sensitive data discovery engine 116 then computes a sensitivity score for the data attribute using the weighted confidence scores computed by the identified sensitive data identification techniques. In a certain implementation, the sensitivity score is computed by determining the maximum value of the weighted confidence scores obtained using each sensitive data identification technique in the set of identified techniques. For instance, the sensitivity score for the data attribute, SSN column may be computed as shown below:

Sensitivity score for SSN column=Max[0,Max[1, 0.95,0.95],0]=1

The sensitive data classification engine 118 then determines a set of enrichment labels to be applied to the data object (i.e., the SSN column) based on the computed sensitivity score. In this example, since the sensitivity score is greater than the first threshold value (>=0.90) the enrichment labels applied to the data object include a glossary term, a custom property and a tag. For instance, the SSN column is enriched using the enrichment labels shown below:
Glossary Term: Social Security Number
Custom Property: Personally Identifiable Information (PII)
Tag: "Sensitive-SSN"

Example #2

The second example shown below illustrates the processing performed by the sensitive data discovery engine 116 and the sensitive data classification engine 118 in the data catalog system 110 shown in FIG. 1 to compute a sensitivity score for a data attribute (named col 3) associated with a file system data asset in the data catalog 120. In example-2 shown below, the data attribute (col 3) stores location information (i.e., addresses) of employees of an enterprise.
Col 3
6649 N Blue Gum St
4 B Blue Ridge Blvd
8 W Cerritos Ave #54
639 Main St
34 Center St
3 Mcauley Dr
Eads St
639 Main St
7 W Jackson Blvd
Boston Ave #88
228 Runamuck Pl #2808
2371.3 Jerrold Ave Table-2 shown below illustrates the determination of confidence scores, weight values and weighted confidence scores for the "col 3" column data attribute by the sensitive data discovery engine 116 using various types of sensitive data identification techniques. The confidence scores may be obtained, for example, as a result of executing block 304 of FIG. 3 and based upon identifying the set of sensitive data identification techniques. The weight values may be assigned, for example, as a result of executing block 306 for each identified sensitive data identification technique. The weighted confidence scores, for example, may be determined as a result of executing step 308 of FIG. 3 after the processing described in 304 and 306 for the identified data attribute is performed using the identified sensitive data identification technique.

TABLE 2

| Sensitive Data Identification Technique | Strategy | Confidence Score | Default Weight Value | Weighted Confidence Score |
| --- | --- | --- | --- | --- |
| Technique -1 (Language Service) | Entity Recognition | 0.98 | 0.8 | 0.78 |
| Technique-2 (Data Safe) | Not applicable | 0 | 1 | 0 |
| Technique-3 (Pattern Inference Engine) | Column Name | 0 | 0.6 | 0 |
|  | Column Data | 0.95 | 0.6 | 0.57 |

As shown in table-2 above, the sensitive data discovery engine 116 identifies a first sensitive data identification technique (technique-1) that uses entity recognition to process the information (metadata) stored in the data attribute (col 3) to obtain a first confidence score for the data attribute. In this example, the first confidence score computed by the first sensitive data identification technique is 0.98 because this technique (e.g., Language Service) is generally applicable to the identification of sensitive information contained in non-relational data assets (e.g., file systems). The default weight value assigned by the sensitive data discovery engine 116 for technique-1 is 0.8. The weighted confidence score determined by the sensitive data discovery engine 116 for the data attribute col 3 using technique-1 is computed as a product of the confidence score (0.98) and the default weight value (0.8) which is equal to 0.78.

As part of the processing performed in block 302 of FIG. 3, in certain examples, the sensitive data discovery engine 116 identifies one or more additional sensitive identification techniques to be used for computing confidence scores for the data attribute. Since col 3 is a data attribute identified in a file system data asset, technique-2 (i.e., the Data Safe technique) which is generally applicable to identifying sensitive information stored in relational data assets, is not used in this case. Accordingly, the weighed confidence score computed for the col 3 attribute using technique-2 is 0.

In certain examples, the sensitive data discovery engine 116 may identify a third sensitive data identification technique (technique 3) that uses pattern inferences to compute a third confidence score for the data object. The confidence score computed for the column name (Col 3) data attribute using this technique is 0 because this technique cannot identity at least based upon the column name (Col 3) that the column stores addresses. However, the confidence score computed for the column data stored in Col 3 using this technique is 0.95 because this technique is able to identity that the column name (Col 3) stores addresses. The default weight value assigned by the sensitive data discovery engine 116 for technique-3=0.8 and the weighed confidence score computed for the col 3 attribute by the sensitive data discovery engine 116 is 0.57.

The sensitive data discovery engine 116 then computes a sensitivity score for the data attribute using the weighted confidence scores computed by the identified sensitive data identification techniques. In a certain implementation, the sensitivity score is computed by determining the maximum value of the weighted confidence scores obtained using each sensitive data identification technique in the set of identified techniques. For instance, the sensitivity score for the col 3 attribute may be computed as shown below Sensitivity score for SSN column=Max[0.78,Max[0, 0,0],Max[0,0.057,0]=0.78

The sensitive data classification engine 118 then determines a set of enrichment labels to be applied to the data object (i.e., the SSN column) based on the computed sensitivity score. In this example, since the sensitivity score is greater than the second threshold value (>=0.75 and <0.90) the enrichment labels applied to the data object include a custom property and a tag. For instance, the col 3 is enriched with the enrichment labels shown below:
Custom Property: Address
Tag: Location Example #3

The third example shown below illustrates the processing performed by the sensitive data discovery engine 116 and the sensitive data classification engine 118 in the data catalog system 110 shown in FIG. 1 to compute a sensitivity score for a data attribute (card number) associated with a database data asset in the data catalog 120. In example-3 shown below, the data attribute (card number) stores credit card information of employees of an enterprise.

| Card Number |
| --- |
| 3782822463100054 |
| 3714496353984314 |
| 3787344936710002 |
| 3735990050950051 |
| 3056930902590424 |
| 3852000002323712 |

| Card Number |
| --- |
| 3646246274200802 |
| 6011111111111110 |
| 6011000990139420 |
| 3530111333300000 |
| 3566002020360500 |
| 5555555555554440 |

Table-3 shown below illustrates the determination of confidence scores, weight values and weighted confidence scores by the sensitive data discovery engine 116 using various types of sensitive data identification techniques for the "card number" column data attribute. The confidence scores may be obtained, for example, as a result of executing block 304 of FIG. 3 and based upon identifying a set of sensitive data identification techniques. The weight values may be assigned, for example, as a result of executing block 306 for each identified sensitive data identification technique. The weighted confidence scores, for example, may be determined as a result of executing step 308 of FIG. 3 after the processing described in 304 and 306 for the identified data attribute is performed using the identified sensitive data identification technique.

TABLE 3

| Sensitive Data Identification Technique | Strategy | Confidence Score | Default Weight Value | Weighted Confidence Score |
| --- | --- | --- | --- | --- |
| Technique -1 (Language Service) | Entity Recognition | 0 | 0.8 | 0 |
| Technique-2 (Data Safe) | Column Name Pattern | 0.9 | 1 | 0.9 |
| | Column Description Pattern | 0 | 1 | 0 |
| | Data Pattern | 1 | 1 | 1 |
| Technique-3 (Pattern Inference Engine) | Column Name | 0.9 | 0.6 | 0.54 |
| | Column Data | 1 | 0.6 | 0.6 |

As shown in table-1 above, the sensitive data discovery engine 116 identifies a first sensitive data identification technique (technique-1) that uses entity recognition to process the information (metadata) stored in the data attribute (card number) to obtain a first confidence score for the data attribute. In this example, the first confidence score computed by the first sensitive data identification technique is zero because this technique is generally applicable to the identification of sensitive information contained in non-relational data assets. The default weight value assigned by the sensitive data discovery engine 116 for technique-1 is 0.8. As a result, the weighted confidence score determined by the sensitive data discovery engine 116 for the data attribute using technique-1 is zero.

As part of the processing performed in block 302 of FIG. 3, in certain examples, the sensitive data discovery engine 116 identifies one or more additional sensitive identification techniques to be used for computing confidence scores for the data attribute. For instance, the sensitive data discovery engine 116 may use a second sensitive data identification technique (technique 2) that identifies column name patterns, column description patterns and data patterns in information stored in the data attribute to obtain individual second confidence scores for the data object. For example, as depicted in table-3, technique-2 may compute a confidence score for the column name pattern of the data attribute (card number) to be 0.9 because it identifies the word "card" in the column name. Additionally, technique-2 may compute a confidence score for the column description pattern to be 0 because it cannot identify a description for the column name attribute. In addition, technique-2 may also compute a confidence score for the data pattern stored in the data attribute to be 1 because it finds a 100% data match in the credit card pattern.

In certain examples, the sensitive data discovery engine 116 may identify a third sensitive data identification technique (technique 3) that uses pattern inferences to compute a third confidence score for the data object. In this case, the confidence score computed by technique-3 is 0.0, the predetermined default weight value assigned by the sensitive data discovery engine 116 for technique-3 is 0.6 and the maximum weighted confidence score determined for the data object using technique-3 is 0.6.

The sensitive data discovery engine 116 then computes a sensitivity score for the data attribute using the weighted confidence scores computed by the identified sensitive data identification techniques. In a certain implementation, the sensitivity score is computed by determining the maximum value of a weighted confidence score obtained by a sensitive data identification technique in the set of identified techniques. For instance, the sensitivity score for the data attribute, card number may be computed as shown below:

Sensitivity score for card number column=Max[0, Max[0.9,0,1],Max[0,0.54,0.6]=1

The sensitive data classification engine 118 then determines a set of enrichment labels to be applied to the data object (i.e., the card number column) based on the computed sensitivity score. In this example, since the sensitivity score is greater than the first threshold value (>=0.90) the enrichment labels applied to the data object include a glossary term, a custom property and a tag. For instance, the card number column is enriched with the enrichment labels shown below:

Glossary Term: Credit Card Number
Custom Property: Personally Card Information (PCI)
Tag: "Sensitive-CC"

FIG. 5 depicts an example of a graphical user interface (GUI) 500 for providing information associated with a data object stored in the data catalog system, according to certain embodiments. The GUI 500 may be presented to a user via the UI 104 in the user's device 102 as part of the sensitive data identification and classification workflow performed by the data catalog system. As shown in FIG. 5, the user has identified a data object (i.e., a data attribute) "address" 502 to obtain information (e.g., enrichment labels and harvested metadata) from the data catalog system for the data object. Upon receiving the request from the user, the data catalog system identifies a set of enrichment labels for the data object. The results of the processing performed by the data catalog system are then communicated back to the requesting user device 102. These results may include harvested metadata 503 associated with the data object 502. The harvested metadata may include, but is not limited to, information that describes the structure of the data source, the configuration parameters associated with the data source and information that describes the structure and type of data objects within the data source.

The results may additionally include enrichment labels identified by the data catalog system as being relevant to the data object. In the example shown in FIG. 5, the enrichment labels for the data object include a set of custom properties 504 identified for the data object, a tag 512 for the data object and a glossary term 514 associated with the data object. The custom properties include a PII entity classification 506 for the data object, a sensitive sensitivity label 508 assigned to the data object and a sensitive category 510 assigned to the data object. The harvested metadata and enrichment labels illustrated in FIG. 5 are only examples of certain types of metadata and labels shown via the UI of the user's device. In other examples, other types of harvested metadata and enrichment labels not shown in the UI may also be provided to the user via the UI.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
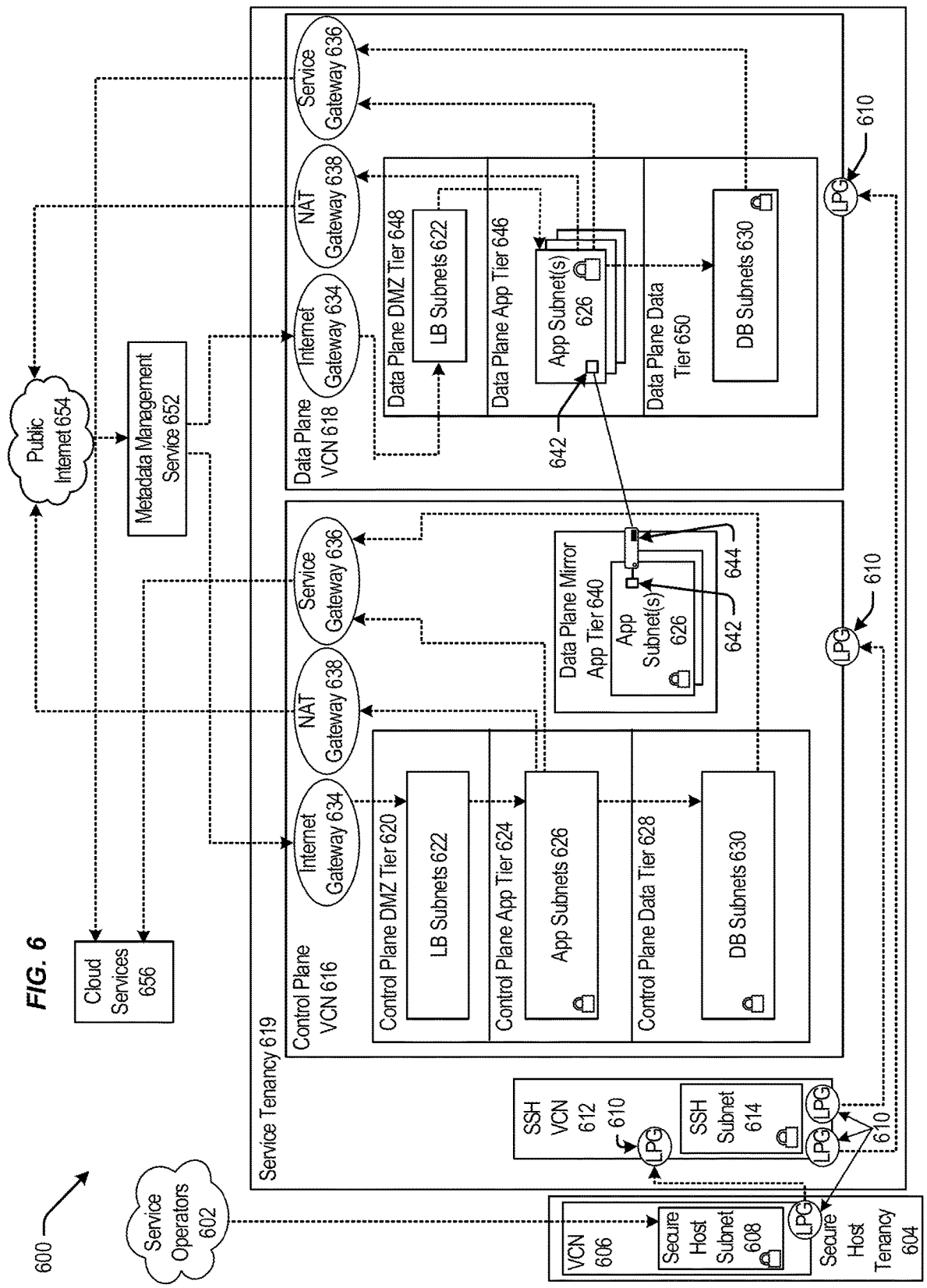
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
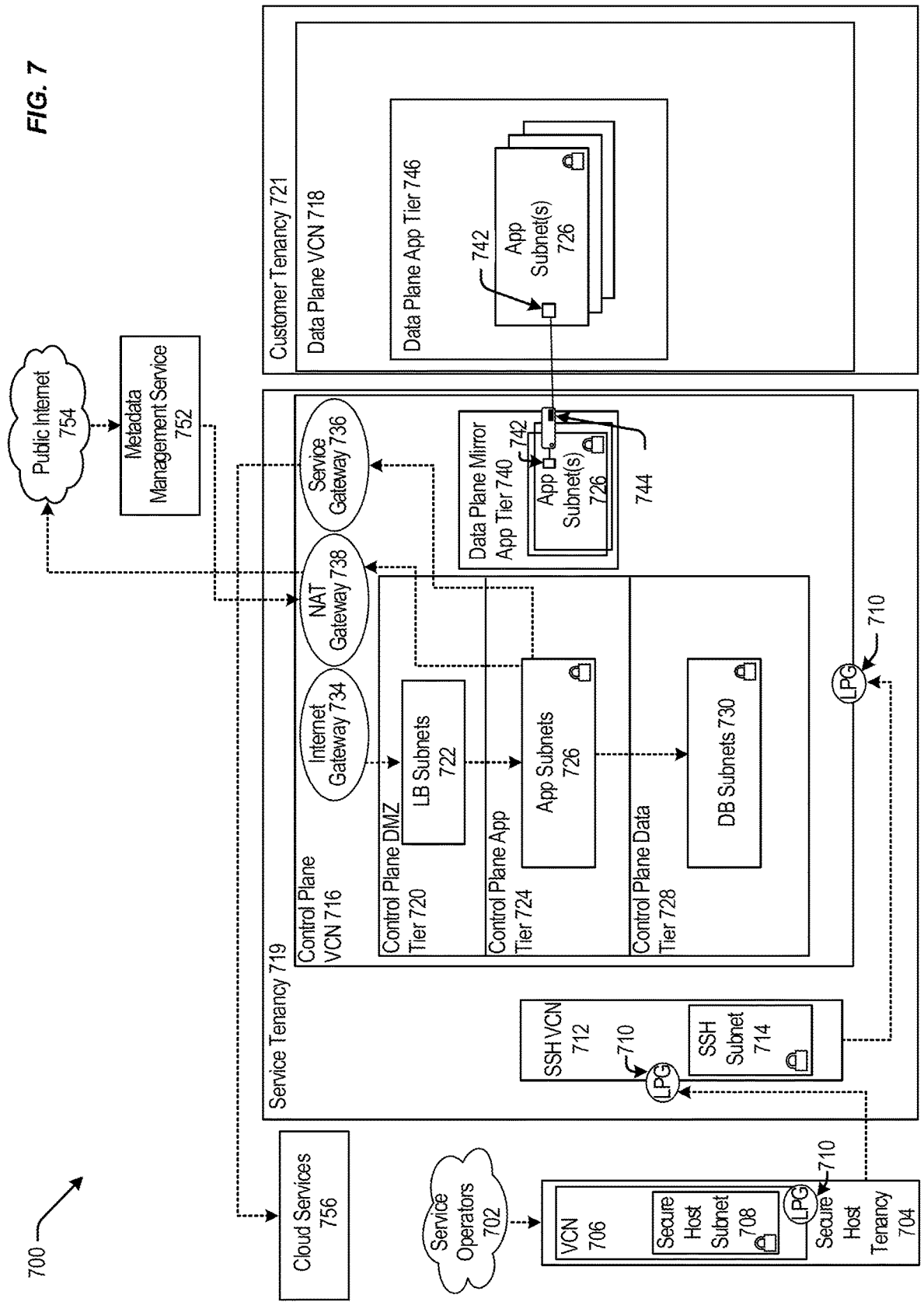
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
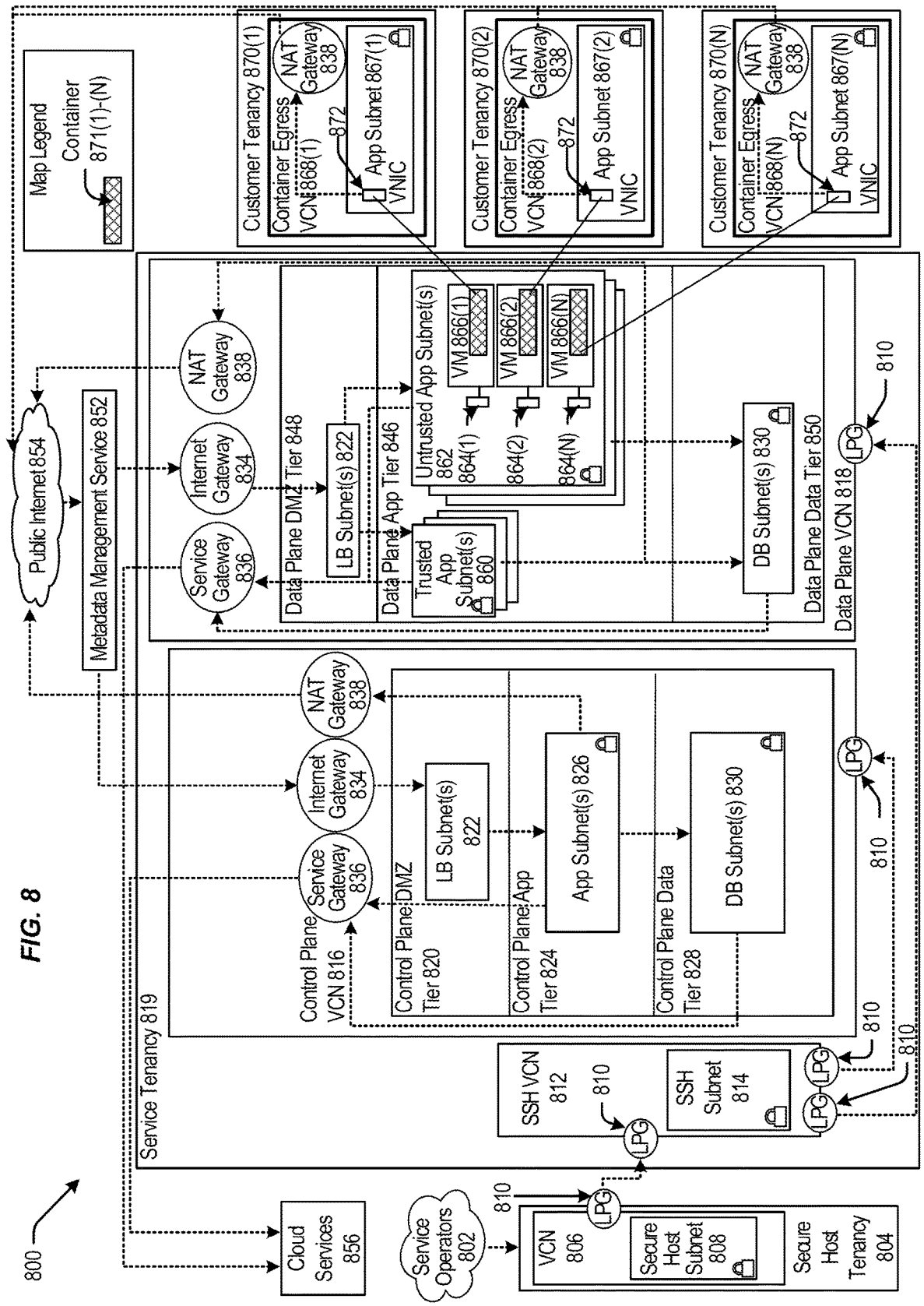
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
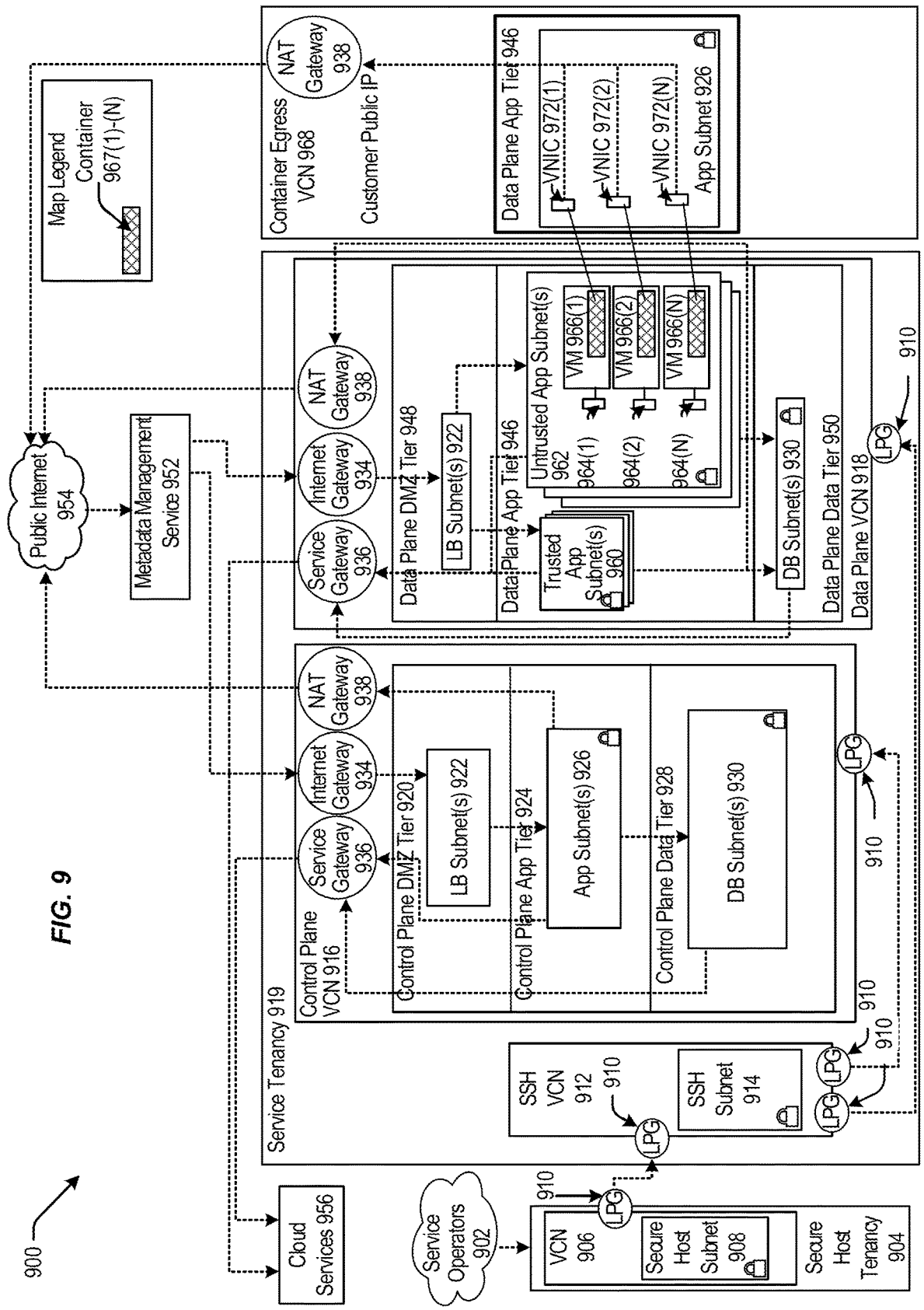
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6)

via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
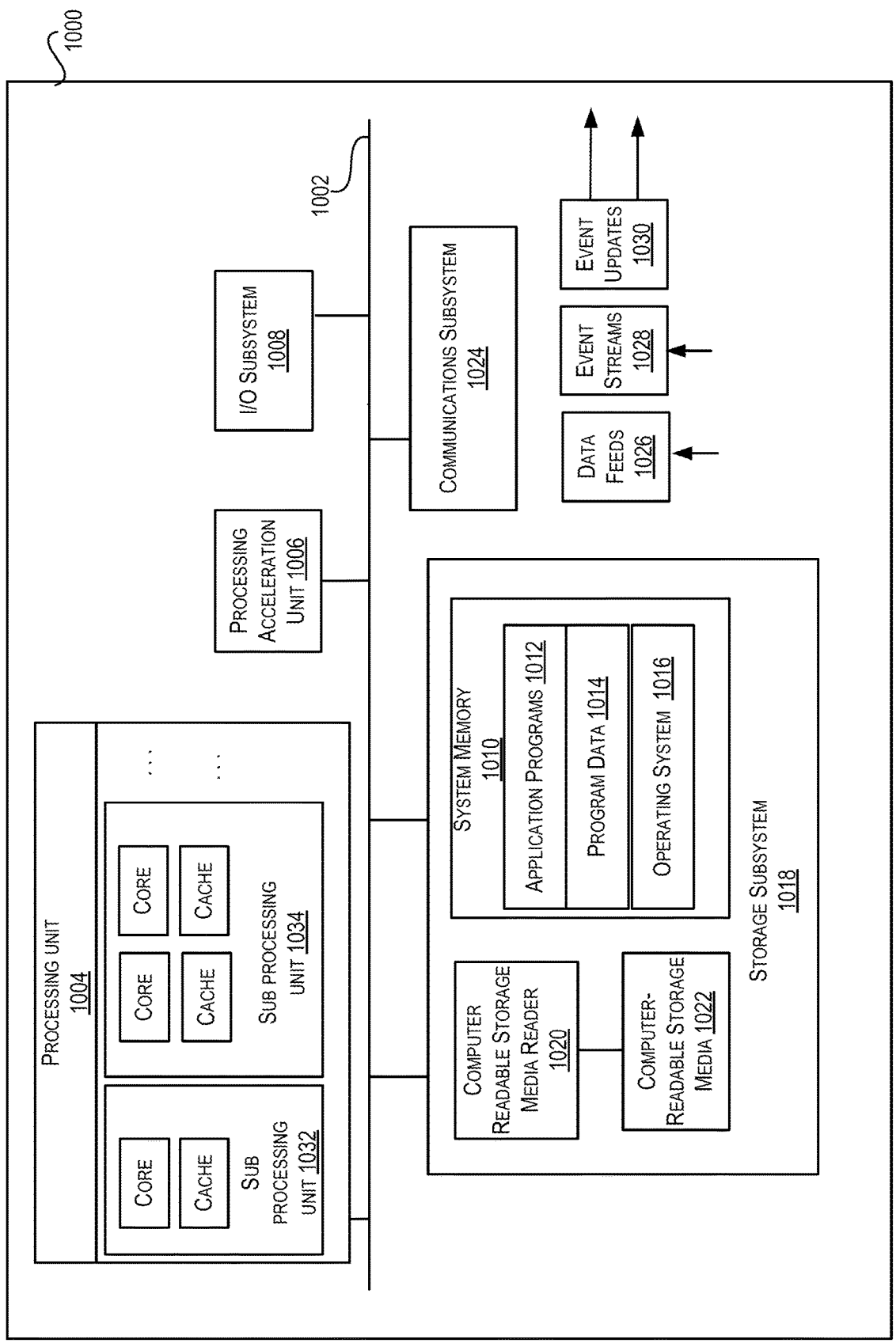
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    identifying, by a computing system, a first sensitive data identification technique from a plurality of sensitive data identification techniques for identifying sensitive information stored in a first plurality of data objects associated with a first data asset, wherein the first data asset is a relational data asset;
    identifying, by the computing system, a second sensitive data identification technique from the plurality of sensitive data identification techniques for identifying sensitive information stored in a second plurality of data objects associated with a second data asset, wherein the second data asset is a non-relational data asset;
    identifying, by a computing system, a data object stored in a data catalog metadata repository, the data object associated with the first data asset;
    applying, by the computing system, the first sensitive data identification technique to the data object to compute a first confidence score for the data object;
    applying, by the computing system, the second sensitive data identification technique to the data object to compute a second confidence score for the data object;
    computing, by the computing system, a first weighted confidence score for the data object using the first sensitive data identification technique;
    computing, by the computing system, a second weighted confidence score for the data object using the second sensitive data identification technique;
    determining, by the computing system, that the first weighted confidence score computed for the data object is greater than the second weighted confidence score computed for the data object;
    responsive to determining that the first weighted confidence score is greater than the second weighted confidence score, computing, by the computing system, a sensitivity score for the data object based at least in part on the first weighted confidence score computed for the data object using the first sensitive data identification technique;
    determining, by the computing system, a set of one or more enrichment labels for the data object based at least in part on the sensitivity score computed for the data object; and
    providing, by the computing system, the set of one or more enrichment labels determined for the data object to a user device associated with the computing system.

2. The method of claim 1, wherein computing the first weighted confidence score for the data object further comprises:
    determining a first weight value to be assigned to the first sensitive data identification technique; and determining, based at least in part on a product of the first confidence score and the first weight value, the first weighted confidence score for the data object.

3. The method of claim 1, wherein the first confidence score for the data object is a measure of accuracy of presence of sensitive information in the data object computed by the first sensitive data identification technique and wherein the second confidence score for the data object is a measure of accuracy of presence of sensitive information in the data object computed by the second sensitive data identification technique.

4. The method of claim 1, wherein determining, by the computing system, the set of one or more enrichment labels for the data object based at least in part on the sensitivity score computed for the data object comprises:
  determining whether the sensitivity score is greater than a first threshold value; and
  in accordance with a determination that the sensitivity score is greater than the first threshold value, determining a first set of enrichment labels to be applied to the data object, wherein the first set of enrichment labels comprise a set of one or more custom properties for the data object, a glossary term for the data object, or a tag for the data object.

5. The method of claim 4, wherein the set of one or more custom properties for the data object classify the data object into a Personal Information Identification (PII) data object, assign a data sensitivity label to the data object, or classify the data object into a particular type of sensitive data category.

6. The method of claim 1, wherein determining, by the computing system, the set of one or more enrichment labels for the data object based at least in part on the sensitivity score computed for the data object comprises:
  determining whether the sensitivity score is lesser than a first threshold value and greater than a second threshold value; and
  in accordance with a determination that the sensitivity score is lesser than the first threshold value and greater than the second threshold value, determining a second set of enrichment labels to be applied to the data object, wherein the second set of enrichment labels comprise a set of one or more custom properties for the data object and a tag for the data object.

7. The method of claim 1, wherein determining, by the computing system, the set of one or more enrichment labels for the data object based at least in part on the sensitivity score computed for the data object comprises:
  determining whether the sensitivity score is lesser than a second threshold value and greater than a third threshold value; and
  in accordance with a determination that the sensitivity score is lesser than the second threshold value and greater than the third threshold value, determining a third set of enrichment labels to be applied to the data object, wherein the third set of enrichment labels comprise a tag for the data object.

8. The method of claim 1, wherein the data object comprises a data entity or a data attribute associated with the data asset, and wherein the data asset comprises a database, a file system, or an object storage system in the data catalog metadata repository.

9. The method of claim 1, further comprising providing, by the computing system, harvested metadata associated with the data object to the user, the harvested metadata comprising information that describes the structure of the data asset associated with the data object, a set of configuration parameters associated with the data asset, and information describing at least a structure and a type of the data object.

10. A data catalog system comprising:
  memory; and
  one or more processors configured to perform processing, the processing comprising:
    identifying, by a computing system, a first sensitive data identification technique from a plurality of sensitive data identification techniques for identifying sensitive information stored in a first plurality of data objects associated with a first data asset, wherein the first data asset is a relational data asset;
    identifying, by the computing system, a second sensitive data identification technique from the plurality of sensitive data identification techniques for identifying sensitive information stored in a second plurality of data objects associated with a second data asset, wherein the second data asset is a non-relational data asset;
    identifying a data object stored in a data catalog metadata repository, the data object associated with the first data asset;
    applying, by the computing system, the first sensitive data identification technique to the data object to compute a first confidence score for the data object;
    applying, by the computing system, the second sensitive data identification technique to the data object to compute a second confidence score for the data object;
    computing, by the computing system, a first weighted confidence score for the data object using the first sensitive data identification technique;
    computing, by the computing system, a second weighted confidence score for the data object using the second sensitive data identification technique;
    determining, by the computing system, that the first weighted confidence score computed for the data object is greater than the second weighted confidence score computed for the data object;
    responsive to determining that the first weighted confidence score is greater than the second weighted confidence score, computing a sensitivity score for the data object based at least in part on the first weighted confidence score computed for the data object using the first sensitive data identification technique;
    determining a set of one or more enrichment labels for the data object based at least in part on the sensitivity score computed for the data object; and
    providing the set of one or more enrichment labels determined for the data object to a user device associated with the computing system.

11. The system of claim 10, wherein computing the first weighted confidence score for the data object further comprises:
  determining a first weight value to be assigned to the first sensitive data identification technique; and
  determining, based at least in part on a product of the first confidence score and the first weight value, the first weighted confidence score for the data object.

12. The system of claim 10, wherein the first confidence score for the data object is a measure of accuracy of presence of sensitive information in the data object computed by the first sensitive data identification technique and wherein the second confidence score for the data object is a measure of accuracy of presence of sensitive information in the data object computed by the second sensitive data identification technique.

13. The system of claim 10, wherein determining the set of one or more enrichment labels for the data object based at least in part on the sensitivity score computed for the data object comprises:
   determining whether the sensitivity score is greater than a first threshold value; and
   in accordance with a determination that the sensitivity score is greater than the first threshold value, determining a first set of enrichment labels to be applied to the data object, wherein the first set of enrichment labels comprise a set of one or more custom properties for the data object, a glossary term for the data object, or a tag for the data object.

14. The system of claim 13, wherein the set of one or more custom properties for the data object classify the data object into a Personal Information Identification (PII) data object, assign a data sensitivity label to the data object, or classify the data object into a particular type of sensitive data category.

15. The system of claim 10, wherein the data object comprises a data entity or a data attribute associated with the data asset, and wherein the data asset comprises a database, a file system, or an object storage system in the data catalog metadata repository.

16. A non-transitory computer-readable medium having program code that is stored thereon, the program code executable by one or more processing devices for performing operations comprising:
   identifying, by a computing system, a first sensitive data identification technique from a plurality of sensitive data identification techniques for identifying sensitive information stored in a first plurality of data objects associated with a first data asset;
   identifying, by the computing system, a second sensitive data identification technique from the plurality of sensitive data identification techniques for identifying sensitive information stored in a second plurality of data objects associated with a second data asset;
   identifying a data object stored in a data catalog metadata repository, the data object associated with the first data asset;
   applying, by the computing system, the first sensitive data identification technique to the data object to compute a first confidence score for the data object;
   applying, by the computing system, the second sensitive data identification technique to the data object to compute a second confidence score for the data object;
   computing, by the computing system, a first weighted confidence score for the data object using the first sensitive data identification technique;
   computing, by the computing system, a second weighted confidence score for the data object using the second sensitive data identification technique;
   determining, by the computing system, that the first weighted confidence score computed for the data object is greater than the second weighted confidence score computed for the data object;
   responsive to determining that the first weighted confidence score is greater than the second weighted confidence score, computing a sensitivity score for the data object based at least in part on the first weighted confidence score computed for the data object using the first sensitive data identification technique;
   determining a set of one or more enrichment labels for the data object based at least in part on the sensitivity score computed for the data object; and
   providing the set of one or more enrichment labels determined for the data object to a user device.

17. The non-transitory computer-readable medium of claim 16, wherein computing the first weighted confidence score for the data object comprises:
   determining a first weight value to be assigned to the first sensitive data identification technique; and
   determining, based at least in part on a product of the first confidence score and the first weight value, the first weighted confidence score for the data object.

18. The method of claim 2, further comprising:
   determining the first weight value to be assigned to the first sensitive data identification technique based at least in part on the datatype of the data object being processed by the first sensitive data identification technique; and
   determining the second weight value to be assigned to the second sensitive data identification technique based at least in part on the datatype of the data object being processed by the second sensitive data identification technique, wherein the first sensitive data identification technique is different from the second sensitive data identification technique.

19. The method of claim 18, wherein the first weight value is different from the second weight value.

20. The method of claim 1, further comprising:
   determining that the second weighted confidence score computed for the data object is greater than the first weighted confidence score computed for the data object; and
   responsive to determining that the second weighted confidence score is greater than the first weighted confidence score, computing the sensitivity score for the data object based at least in part on the second weighted confidence score computed for the data object.

21. The method of claim 20, wherein computing the second weighted confidence score for the data object further comprises:
   determining a second weight value to be assigned to the second sensitive data identification technique; and
   determining, based at least in part on a product of the second confidence score and the second weight value, the second weighted confidence score for the data object.

* * * * *